(12) United States Patent
Longcor et al.

(10) Patent No.: US 12,731,946 B2
(45) Date of Patent: Sep. 8, 2026

(54) GROUNDING RING

(71) Applicant: ABB Schweiz AG, Baden (CH)

(72) Inventors: William K. Longcor, Newton, NJ (US); Michael W. SantaMaria, Washington, NJ (US); Ian C. Waleck, Milford, PA (US); Arthur L. Havrilla, Washington, NJ (US); Aaron M. Motes, Ormond Beach, FL (US); Matthew D. Cawood, DeLeon Springs, FL (US)

(73) Assignee: ABB Schweiz AG, Baden (CH)

( * ) Notice: Subject to any disclaimer, the term of this patent is extended or adjusted under 35 U.S.C. 154(b) by 404 days.

(21) Appl. No.: 18/476,569

(22) Filed: Sep. 28, 2023

(65) Prior Publication Data

US 2025/0112408 A1 Apr. 3, 2025

(51) Int. Cl.

| | |
|---|---|
| ***H01R 13/64*** | (2006.01) |
| ***H01R 13/44*** | (2006.01) |
| ***H01R 13/648*** | (2006.01) |
| ***H02G 7/05*** | (2006.01) |

(52) U.S. Cl.

CPC ........... *H01R 13/648* (2013.01); *H01R 13/44* (2013.01); *H02G 7/056* (2013.01)

(58) Field of Classification Search

CPC ...... H01R 13/648; H01R 13/44; H01R 4/643; H02G 7/056

See application file for complete search history.

(56) References Cited

U.S. PATENT DOCUMENTS

| | | | | |
|---|---|---|---|---|
| 3,609,631 A * | 9/1971 | Looney | H01R 4/643 | 439/100 |
| 3,728,472 A * | 4/1973 | Leuteritz | H01R 4/646 | 439/779 |
| 3,887,895 A * | 6/1975 | Pierzchala | H01R 4/646 | 439/98 |
| 3,967,872 A * | 7/1976 | Mooney | H01R 4/64 | 439/100 |
| 4,008,937 A * | 2/1977 | Filippi | H01R 4/643 | 24/270 |
| 4,623,204 A * | 11/1986 | Auclair | H01R 4/40 | 439/100 |
| 4,738,628 A * | 4/1988 | Rees | H01R 13/648 | 439/97 |
| 4,874,337 A * | 10/1989 | Paukovits, Jr. | H01R 13/6584 | 439/607.18 |
| 4,944,683 A * | 7/1990 | Leonardo | H01R 4/643 | 24/279 |
| 5,620,210 A * | 4/1997 | Eyster | F16L 23/04 | 285/373 |
| 5,722,846 A * | 3/1998 | Lazaro, Jr. | H01R 13/625 | 439/318 |

(Continued)

*Primary Examiner* — Truc T Nguyen

(74) *Attorney, Agent, or Firm* — Even Tabin & Flannery LLP

(57) ABSTRACT

A grounding ring includes: a first clamping member having a radially inward side and a radially outward side, the radially outward side at least in part defining a channel; and a second clamping member disposable within the channel so as to prohibit the second clamping member from moving in an axial direction with respect to the first clamping member, the second clamping member being rotatable with respect to the first clamping member within the channel about the axial direction.

17 Claims, 7 Drawing Sheets

(56) References Cited

U.S. PATENT DOCUMENTS 6,011,218 A * 1/2000 Burek .................... H01R 4/646 439/98
6,419,519 B1 * 7/2002 Young ................ H01R 13/5812 439/446
6,840,782 B1 * 1/2005 Borden .................. H01R 4/643 439/92
7,182,611 B2 * 2/2007 Borden .................. H01R 4/643 439/92
7,575,448 B1 * 8/2009 Whittington ....... B23K 37/0435 439/100
7,758,356 B2 * 7/2010 Burris .................. H01R 9/0524 439/95
7,780,461 B1 * 8/2010 Vernica .................. H01R 4/643 439/100
8,075,024 B2 * 12/2011 Wern ...................... F16L 23/06 285/364
8,809,680 B2 * 8/2014 Kiely ....................... H01R 4/34 439/810
2005/0255728 A1 * 11/2005 Pyron .................... H01R 4/643 439/100
2006/0148286 A1 * 7/2006 Hughes .................. H01R 11/14 439/92
2006/0189203 A1 * 8/2006 Jackson, III ........... H01R 11/15 439/477
2008/0096403 A1 * 4/2008 Hunter ..................... H01R 4/34 439/98
2009/0258520 A1 * 10/2009 Smith ................ H01R 13/5219 439/271
2010/0261390 A1 * 10/2010 Gardner ................... H01R 4/40 439/775
2011/0294364 A1 * 12/2011 Gardner ................... H01R 4/66 29/428
2012/0108112 A1 * 5/2012 Vernica .................... H01R 4/36 29/874
2012/0164857 A1 * 6/2012 Vaughan ............. H02G 3/0683 439/100
2012/0214328 A1 * 8/2012 Downing ................. H01R 4/46 439/345
2013/0023164 A1 * 1/2013 Huang ..................... H01R 4/66 439/794
2013/0178088 A1 * 7/2013 Mangus ............. H01R 13/5812 439/283
2014/0024253 A1 * 1/2014 Wild ........................ H02G 1/00 408/199
2015/0072574 A1 * 3/2015 McGann ................ H01R 11/09 439/879
2015/0104976 A1 * 4/2015 Myong .............. H01R 13/5812 439/607.41
2015/0311606 A1 * 10/2015 Meine ................... F24S 25/636 439/100
2019/0326711 A1 * 10/2019 McRae ................ H01R 13/648
2020/0220304 A1 * 7/2020 McRae .................... H01R 4/26
2025/0112408 A1 * 4/2025 Longcor ................ H01R 13/44

* cited by examiner 2
26
36
12
20
54
4, 22
16
6
28
34
32
38
R
A
C4
44
14
8,10
4, 24
18

GROUNDING RING

FIELD

The present application generally relates to grounding devices that are attachable to protective coverings, such as dead-end receptacles.

BACKGROUND

In power distribution systems, there is a need to electrically ground circuits so as to minimize the risk of electrical shock, particularly with respect to bushing interfaces within such systems. Existing solutions cover each bushing interface of the system with a dead-end receptacle ("DR"), which is a type of protective covering for an electrical connection. A grounding wire is then attached to the DR to provide electrical grounding.

However, since the DR must be rotated with respect to the bushing interface in order to install and remove the DR from the bushing interface, a number of problems exist. For one, during removal of the DR, the grounding wire can become wrapped around the DR, which can inhibit removal if the grounding wire is not of a sufficient length. To avoid this situation, during removal technicians sometimes remove the grounding wire from the DR, which creates unsafe conditions. Moreover, the proper technique for removing a DR involves two technicians, each wielding an insulated pole or "hot stick." to properly position the grounding wire so that it does not become wound around the DR, while at the same time rotating the DR with respect to the bushing interface. This technique is cumbersome, increasing the likelihood that technicians will not follow it, which correspondingly increases the risk of unsafe conditions.

There is therefore a need to improve upon existing grounding solutions for DRs and other protective coverings for electrical connections.

SUMMARY

In an embodiment, the present invention provides a grounding ring, comprising: a first clamping member having a radially inward side and a radially outward side, the radially outward side at least in part defining a channel; and a second clamping member disposable within the channel so as to prohibit the second clamping member from moving in an axial direction with respect to the first clamping member, the second clamping member being rotatable with respect to the first clamping member within the channel about the axial direction.

BRIEF DESCRIPTION OF THE DRAWINGS

Figures 8, 9:
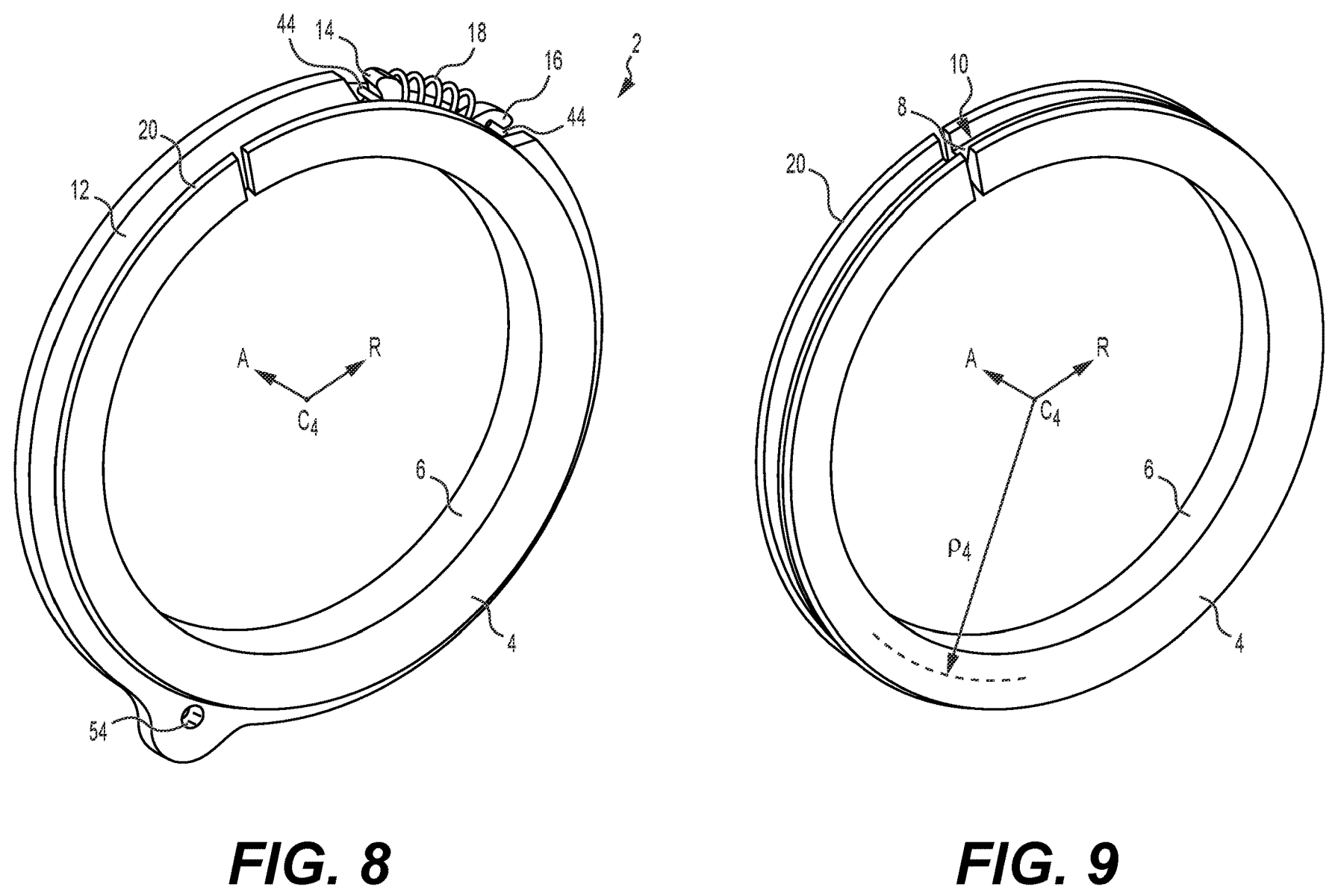

FIG. 8 shows a perspective view of another embodiment of a grounding ring according to the present application;

FIG. 9 shows one clamping member of the grounding ring of FIG. 8;

DETAILED DESCRIPTION

Figures 1, 2, 3A, 3B:
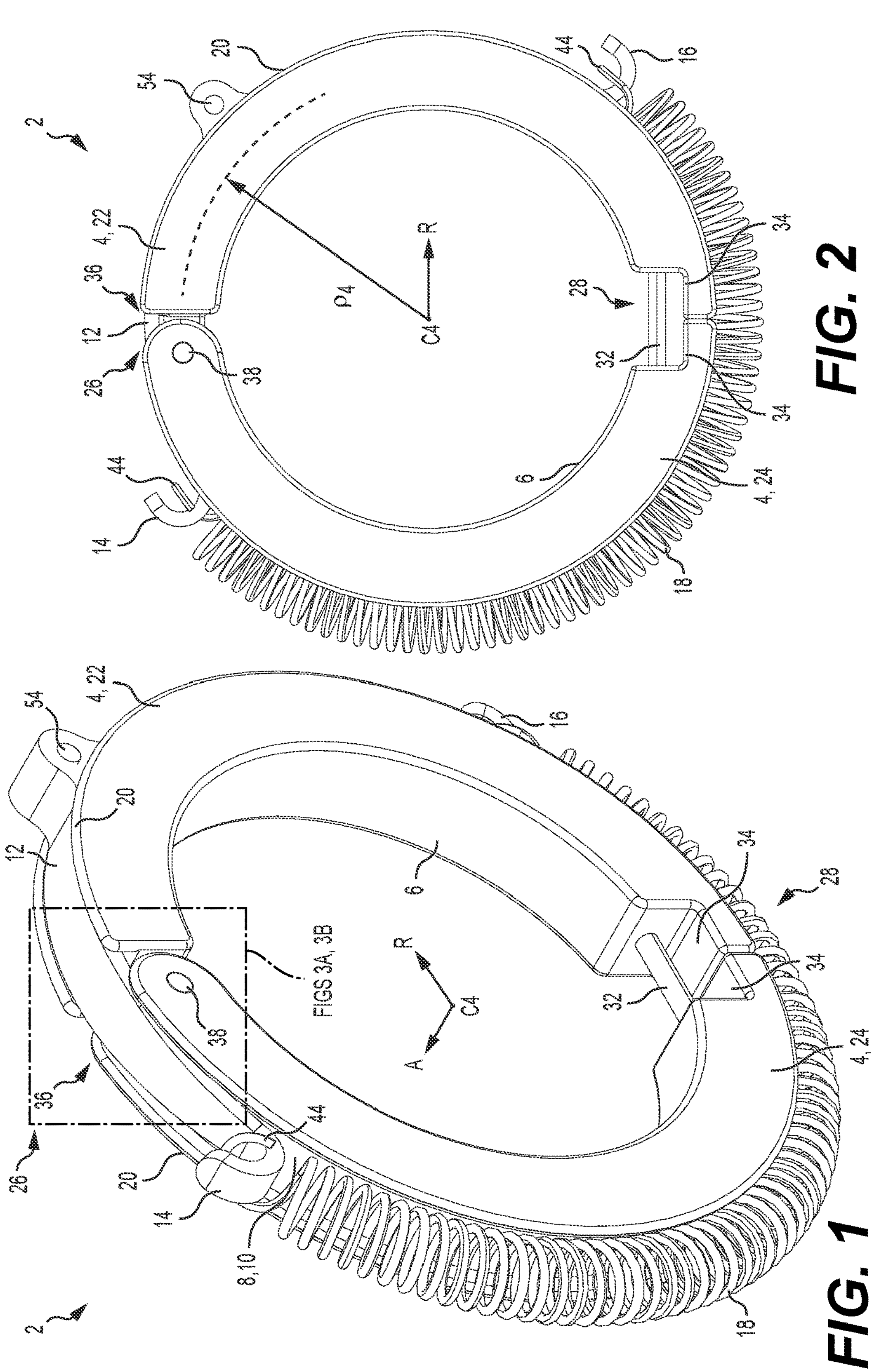
FIG. 1 shows a perspective view of a grounding ring according to the present application.
FIG. 2 shows a front view of the grounding ring of FIG. 1.
FIGS. 3A-3B show detailed views of a rotatable connection of the grounding ring of FIG. 1.

To overcome the problems associated with the prior art, the present application describes grounding rings and methods of grounding a protective covering of an electrical connection, such as a DR. So as to avoid a grounding wire for the protective covering becoming wound around the protective covering during removal or installation of the protective covering, the grounding rings and methods of the present application involve at least a first clamping member positioned in contact with a second clamping member, wherein friction between the first and second clamping members is low enough that a minimally tensioned grounding wire connected to the second clamping member, or to a third clamping member attached to the second clamping member, will cause the second clamping member to spin with respect to the first clamping member. As such, even if the first clamping member, which could be positioned on the protective covering or even be part of the protective covering, moves, the grounding wire will not spin, and will therefore not become inadvertently wound around the protective covering during installation or removal of the protective covering.

FIGS. 1-4 show details of one embodiment of a grounding ring 2 according to the present application. Grounding ring 2 has a first clamping member 4 having a radially inward side 6 and a radially outward side 8. Radially inward side 6 faces toward a center $C_4$ of first clamping member 4 along radial direction R, while radially outward side 8 faces away from center $C_4$ of first clamping member 4 along radial direction R. In this manner, first clamping member 4 has a generally circular shape, although other shapes are possible and within the scope of the present application. In general, however, first clamping member 4 has a shape that largely corresponds to a shape of a protective covering that grounding ring 2 will be used to electrically ground, such as protective covering 46 shown FIGS. 5-7. In this specific case, protective covering 46 has a generally cylindrical shape, which may or may not be tapered along a length of protective covering 46. Such correspondence of shape (i.e., between radially inward side 6 of grounding ring 2 and the outermost surface of protective covering 46) allows grounding ring 2 to be disposed around protective covering 46 with a relatively snug fit. Moreover, if desired, grounding ring 2 can be fixed in place with respect to protective covering 46, as discussed in more detail below. Alternatively, first clamping member 4 can be an integral part or component of protective covering 46, rather than a discrete component.

Figures 3A, 3B, 4:
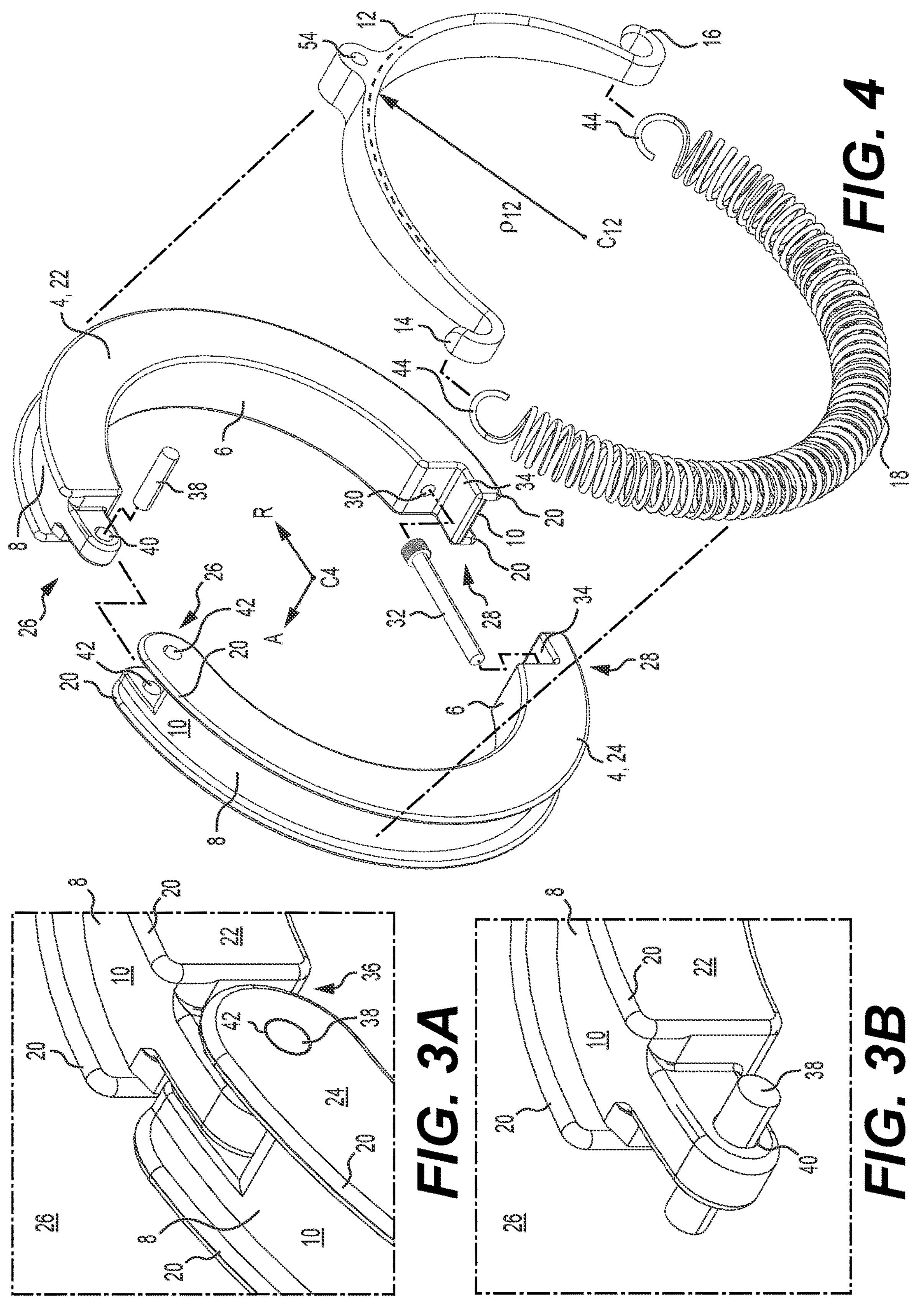
FIG. 4 shows an exploded view of the grounding ring of FIG. 1.

As shown in FIG. 4, radially outward side 8 of first clamping member 4 at least in part defines a channel 10. Specifically, radially outward side 8 of first clamping member 4 is not the radially most outward portion of first clamping member 4, but is instead recessed from a maximum radial extent of first clamping member 4. In this manner, channel 10 can have channel walls 20 further defining channel 10, with channel walls 20 extending outward in radial direction R. Each channel wall 20 is offset a distance in axial direction A with respect to center $C_4$ of first clamping member 4, axial direction A being perpendicular to radial direction R. Channel walls 20 can extend along a circumference of first clamping member 4.

Grounding ring 2 also includes a second clamping member 12. Second clamping member 12 is disposable within channel 10 so as to prohibit second clamping member 12 from moving in axial direction A with respect to first clamping member 4. Nevertheless, the fit between second clamping member 12 and first clamping member 4 when second clamping member 12 is disposed in channel 10 is loose enough that second clamping member 12 is rotatable with respect to first clamping member 4 within channel 10 about axial direction A. Moreover, the friction between second clamping member 12 and first clamping member 4 when second clamping member 12 is disposed in channel 10 is also low enough so as to not inhibit this rotation. Such a configuration allows a minimally tensioned grounding wire (such as grounding wire 52 shown in FIG. 7) connected to second clamping member 12 to cause second clamping member 12 to spin with respect to first clamping member 4, as first clamping member 4 stays in place with respect to protective covering 46. Second clamping member 12 also includes a first attachment portion 14 and a second attachment portion 16. First attachment portion 14 and second attachment portion 16 can, for example, be hooks, as shown in 1-2 and 4. Alternatively first attachment portion 14 and second attachment portion 16 could be screw holes or the like.

As shown in FIGS. 2 and 4, first clamping member 4 can have a first clamping member radius of curvature $\rho_4$ with respect to center $C_4$ of first clamping member 4, while second clamping member 12 can have a second clamping member radius of curvature $\rho_{12}$ with respect to center $C_{12}$ of second clamping member 12. First clamping member radius of curvature $\rho_4$ and second clamping member radius of curvature $\rho_{12}$ can be approximately equal. In particular, second clamping member radius of curvature $\rho_{12}$ is of the same magnitude but just slightly larger than first clamping member radius of curvature $\rho_4$, as second clamping member 12 rests on radially outward side 8 of first clamping member 4. As such, this arrangement causes second clamping member 12 to be just slightly more radially outward in radial direction R than first clamping member 4, making second clamping member radius of curvature $\rho_{12}$ slightly larger than first clamping member radius of curvature $\rho_4$. This relationship between the radii of curvature $\rho_4$, $\rho_{12}$ helps to maintain contact between first clamping member 4 and second clamping member 12 to facilitate grounding. Furthermore, the radii of curvature relationship also helps second clamping member 12 be attachable to first clamping member 4 (i.e., without needing any other clamping members, such as third clamping member 18, discussed in further detail below).

Although not required, grounding ring 2 can include a third clamping member 18. Third clamping member 18 is attachable to first attachment portion 14 and a second attachment portion 16 of second clamping member 12 so as to maintain second clamping member 12 within channel 10 of first clamping member 4 and in contact with first clamping member 4. In this arrangement, the movement of second clamping member 12 is constrained with respect first clamping member 4 in that second clamping member 12 cannot move in axial direction A or in radial direction R with respect to first clamping member 4, but can rotate or spin with respect to first clamping member 4 about axial direction A.

Although not necessary, third clamping member 18 can also be at least partially disposable in channel 10 of first clamping member 4, as shown in FIG. 2, and conformable to radially outward side 8 of first clamping member 4. Moreover, third clamping member 18 can be an elastic member, such as a helical extension spring or a tension spring, among other elastic members. In this regard, third clamping member 18 can be any sort of object that is capable of attaching to first attachment portion 14 and a second attachment portion 16 of second clamping member 12 to hold second clamping member 12 in place within channel 10. For example, third clamping member 18 could also be a screw or a bolt. To help attach third clamping member 18 to first attachment portion 14 and second attachment portion 16 of second clamping member 12, third clamping member 18 can include on either end thereof a grasping portion 44.

Figure 7:
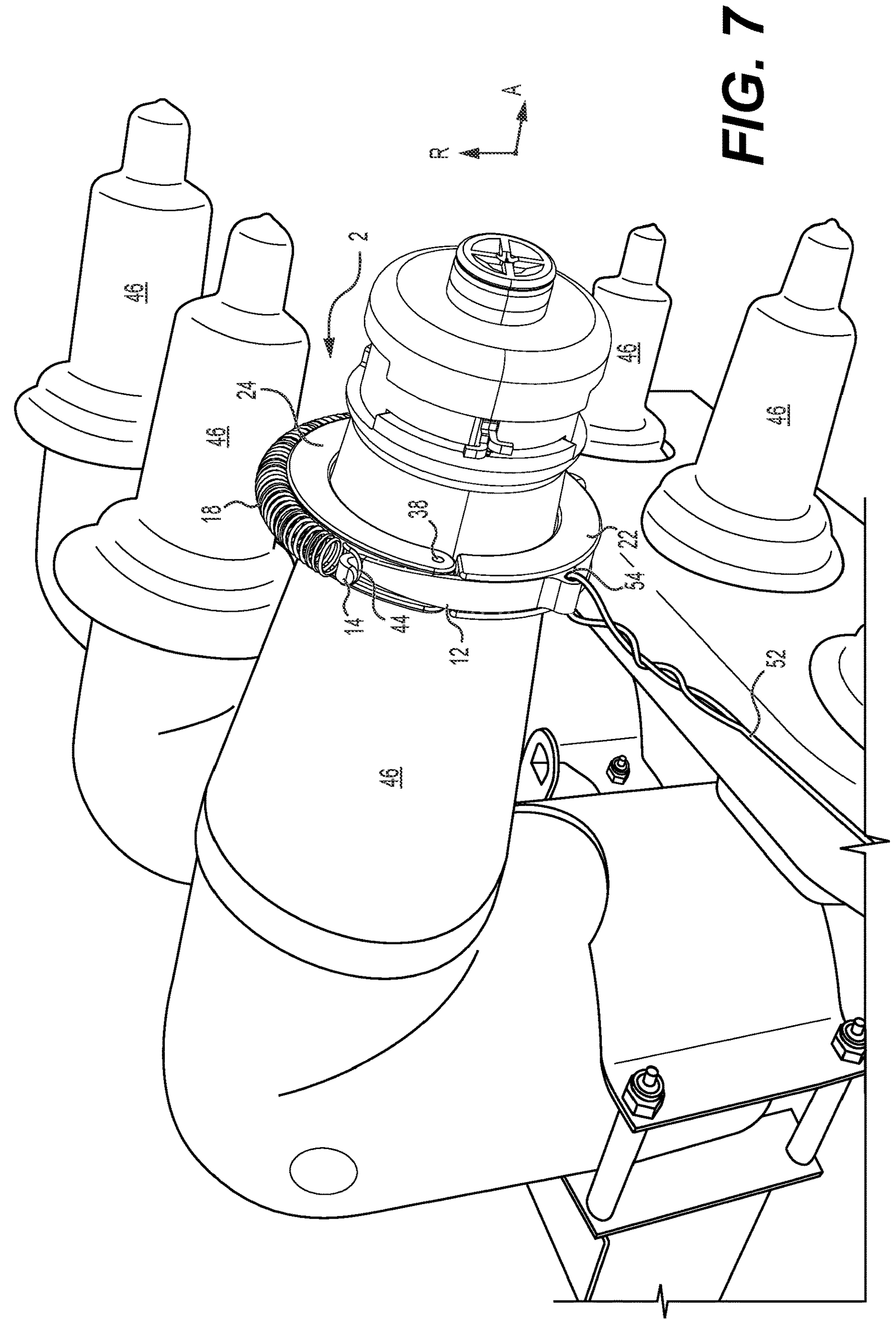
FIG. 7 shows the grounding ring of FIG. 1 disposed on a protective covering of an electrical connection, with a grounding wire attached thereto.
Figures 10, 11:
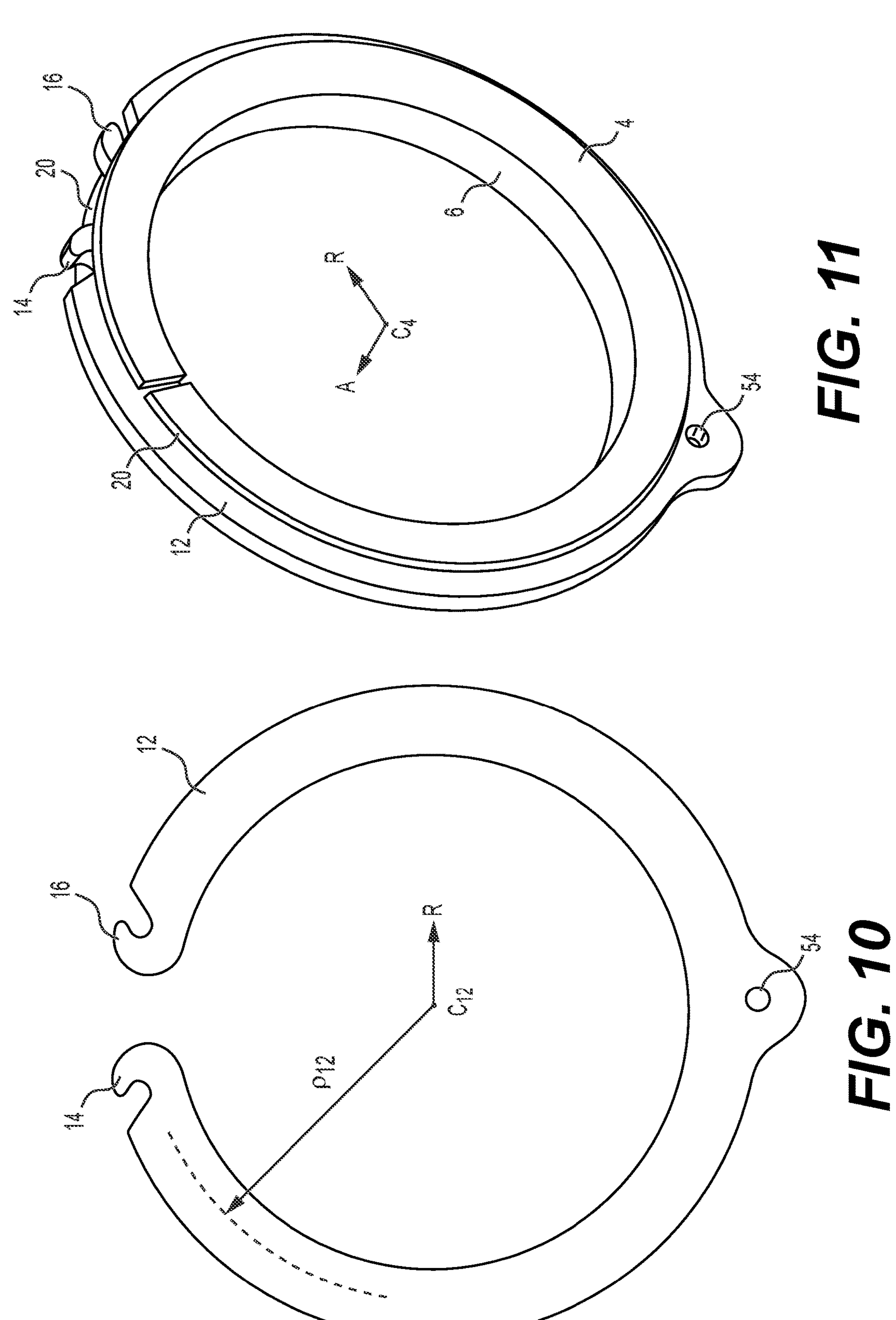
FIG. 10 shows another clamping member of the grounding ring of FIG. 8.
FIG. 11 shows two clamping members of the grounding ring of FIG. 8.

At least one of second clamping member 12 and third clamping member 18 comprises a ground carrier for attaching a grounding wire, such as grounding wire 52 shown in FIG. 7. In particular, at least one of second clamping member 12 and third clamping member 18 can include a grounding wire mount 54, such as a hole, that allows grounding wire 52 to be attached to grounding ring 2. Grounding wire 52, as its name suggests, serves to electrically ground grounding ring 2 and any component to which grounding ring 2 is attached, such as protective covering 46. Furthermore, to facilitate grounding, first clamping member 4, second clamping member 12, and third clamping member 18 can each be made of a semi-conductive plastic or a metal.

In the embodiment shown in FIGS. 1-4, first clamping member 4 can be comprised of more than one part. For example, first clamping member 4 can include a first arc section 22 and a second arc section 24, which work together to allow first clamping member 4 to be disposed on protective covering 46. To facilitate disposition of such first clamping member 4 on protective covering 46, first arc section 22 and second arc section 24 can be rotatably attached to one another. In particular, first arc section 22 and second arc section 24 each can have a rotation end 26 and a fastening end 28, fastening end 28 being disposed opposite rotation end 26 on respective arc section 22, 24.

As shown in more detail in FIGS. 3A-3B, rotation ends 26 of first are section 22 and second arc section 24 together provide a pinned hinge 36. Pinned hinge 36 comprises a pin 38 that passes through a first outward pin hole 42 on second are section 24, then through inward pin hole 40 on first arc section 22, then through a second outward pin hole 42 on second arc section 24. Although the figures show inward pin hole 40 being disposed first arc section 22 and outward pin holes 42 being disposed on second arc section 24, the opposite arrangement is also possible (i.e., inward pin hole 40 being disposed on second arc section 24 and outward pin holes 42 being disposed on first arc section 22). In either case, however, the rotatable nature of a grounding ring 2 with first arc section 22 and second arc section 24 is the same.

Fastening ends 28 of first arc section 22 and second arc section 24 are where a grounding ring 2 with first arc section 22 and second arc section 24 is fastened about protective covering 46. For example, fastening ends 28 of first arc section 22 and second arc section 24 can each include a fastener hole 30. Once first arc section 22 and second arc section 24 are positioned on protective covering 46 and fastening ends 28 thereof are brought closer together, a fastener 32, such as a screw or a bolt, can be inserted into fastener holes 30 of first arc section 22 and second are section 24, and subsequently tightened so as to bring arc section 22 and second arc section 24 even closer together and secure grounding ring 2 on protective covering 46 such that grounding ring 2 is fixed in place with respect to protective covering 46.

First are section 22 and second arc section 24 each can have a cutout 34 on radially inward side 6 of first clamping member 4, at fastening ends 28. Cutouts 34 allow first clamping member 4 to better correspond to the shape of protective covering 46 when first clamping member 4 is disposed on protective covering 46, as discussed in more detail below.

Figure 6:
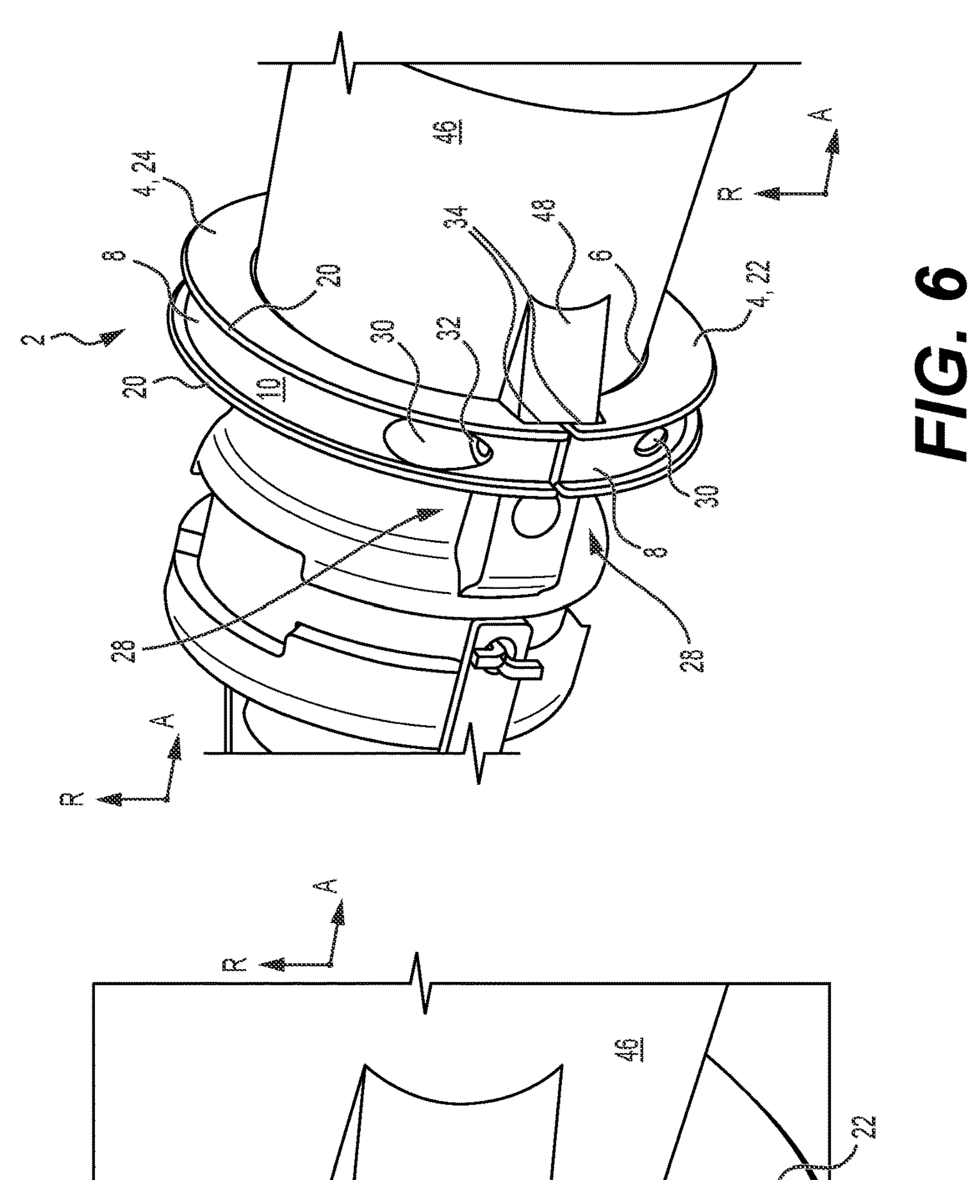
FIG. 6 shows a clamping member of the grounding ring of FIG. 1 disposed on a protective covering of an electrical connection.
Figure 5:
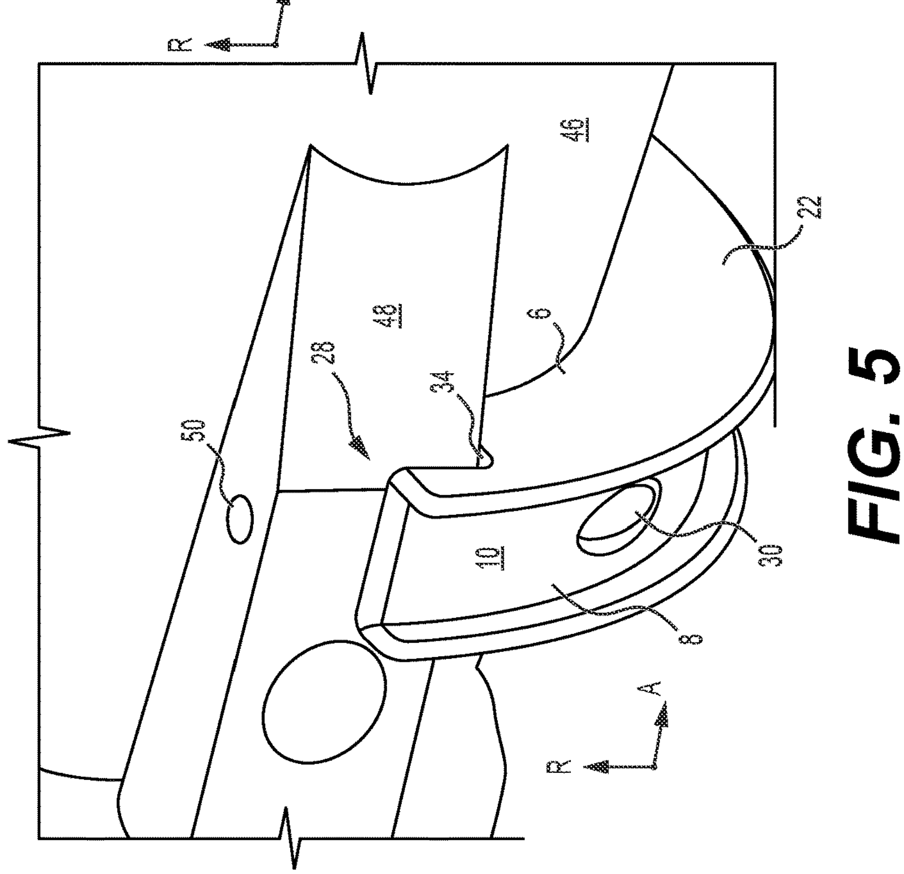
FIG. 5 shows a detailed view of one portion of a clamping member of the grounding ring of FIG. 1 disposed on a protective covering of an electrical connection.

FIGS. 5-7 show how grounding ring 2 of FIGS. 1-4 can be used to ground a protective covering of an electrical connection, such as protective covering 46. As shown in FIGS. 5-6, the method includes providing first clamping member 4, which in this case is comprised of first arc section 22 and second are section 24. As discussed above, first clamping member 4 has both radially inward side 6 and radially outward side 8, with radially outward side 8 at least in part defining channel 10. Radially inward side 6 of first clamping member 4 (in this case, first radially inward side 6 of first arc section 22, then radially inward side 6 of second arc section 24) is disposed around protective covering 46, as shown in FIG. 6. It is also within the scope of the present application that disposing radially inward side 6 of first clamping member 4 around protective covering 46 could comprise augmenting the external surface of protective covering 46. e.g., by molding first clamping member 4 onto protective covering 46 such that first clamping member 4 is really a feature of protective covering 46.

In the event that protective covering 46 includes a fixed feature 48 (which fixed feature 48 is different than a first clamping member 46 molded onto the external surface of protective covering 46), first clamping member 4 can be positioned such that cutouts 34 thereof accommodate fixed feature 48 therein. Such a configuration helps to limit the rotation of first clamping member 4 with respect to protective covering 46 about axial direction A. Fixed feature 48 may be an existing feature of protective cover 46 (e.g., a residual feature used in connection with previous grounding devices for protective covering 46). In this manner, grounding ring 2 of FIGS. 1-4 can make use of existing features of protective covering 46 to improve the functionality of grounding ring 2. Fixed feature 48 may also include an anchor hole 50, which is where a grounding wire 52 may have been attached previously (i.e., when using previous grounding devices). FIG. 6 shows how cutouts 34 of first clamping member 4 accommodate fixed feature 48 when fastening ends 28 of first arc section 22 and second arc section 24 are brought closer to one another.

As shown in FIG. 7, second clamping member 12 can be disposed within channel 10 of first clamping member 4. Positioning second clamping member 12 in this manner prohibits second clamping member 12 from moving in axial direction A with respect to first clamping member 4. However, as discussed previously, second clamping member 12 is still rotatable with respect to first clamping member 4 about axial direction A. Optionally, a third clamping member 18 can be affixed to second clamping member 12 so as to secure second clamping member 12 within channel 10. As one example, grasping portions 44 of third clamping member 18 can be attached to first attachment portion 14 and second attachment portion 16 of second clamping member 12.

To ground grounding ring 2 and protective cover 46, grounding wire 52 is attached to at least one of second clamping member 12 and third clamping member 18. In the embodiment shown, grounding wire 52 is attached to grounding wire mount 54 on second clamping member 12. Alternatively, third clamping member 18 could have a grounding wire mount 54 for affixing grounding wire 52.

Returning to FIG. 6, when first grounding ring 4 is comprised of first arc section 22 and second arc section 24, disposing radially inward side 6 of first clamping member 4 around protective covering 46 comprises bringing fastening end 28 of first arc section 22 closer to fastening end 28 of second arc section 24.

The method can also include affixing first clamping member 4 to protective covering 46. For example, when protective covering 46 includes fixed feature 48 with anchor hole 50, first arc section 22 and second arc section 24 can each have a fastener hole 30 that aligns with anchor hole 50 of fixed feature 48 when fastening end 28 of first arc section 22 is brought closer to fastening end 28 of second arc section 24. Consequently, fastener 32 may be inserted through first fastener hole 30 of first arc section 22, through anchor hole 50, then through second fastener hole 30 of second arc section 24. Tightening fastener 32 with respect to first clamping member 4 can then affix first clamping member 4 to protective covering 46 by way of fixed feature 48 of protective covering 46 and its anchor hole 50.

Figure 12:
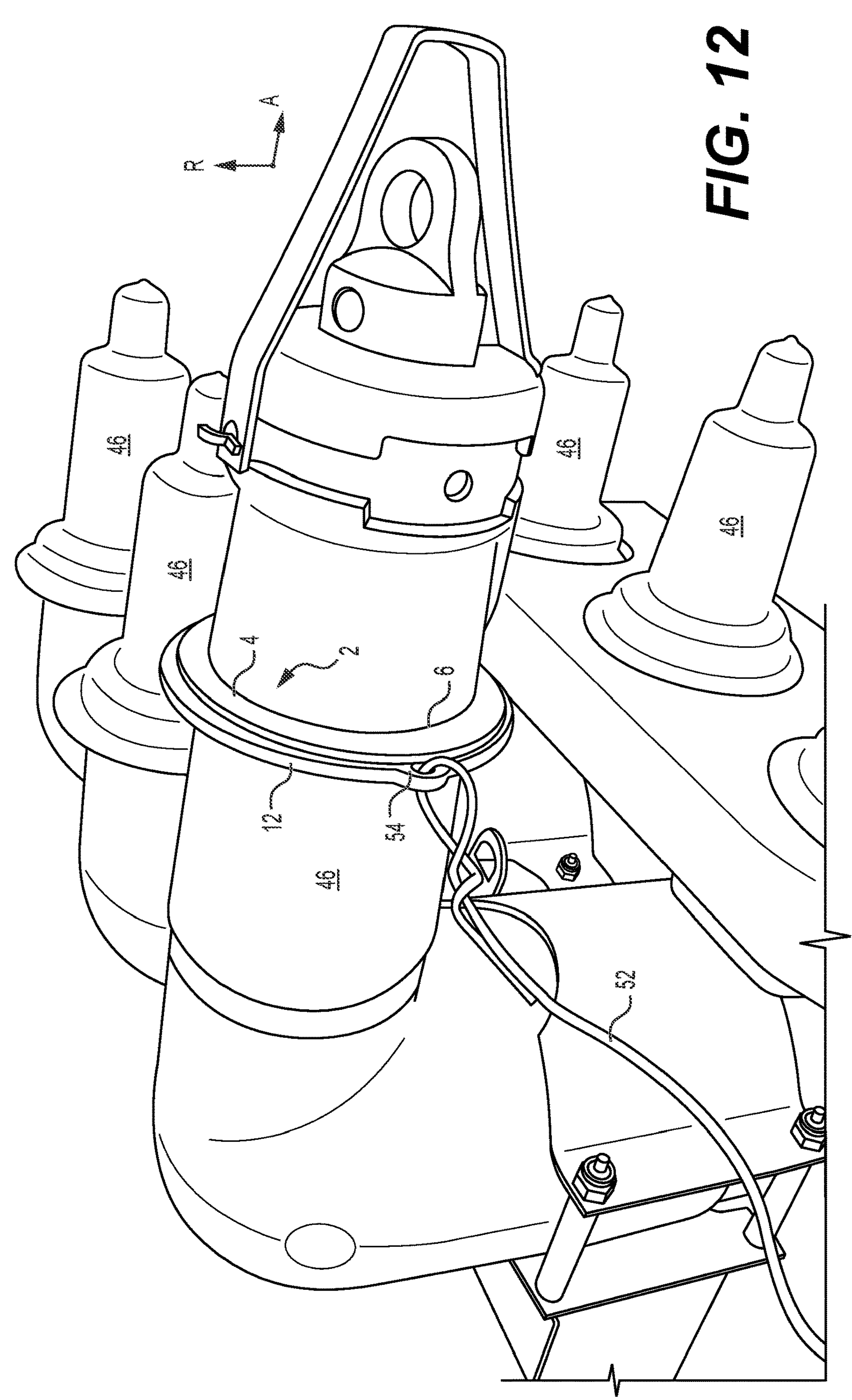
FIG. 12 shows the grounding ring of FIG. 8 disposed on a protective covering of an electrical connection, with a grounding wire attached thereto.

FIGS. 8-12 show another embodiment of grounding ring 2. Grounding ring 2 in FIGS. 8-12 is generally similar to grounding ring 2 in FIGS. 1-7. As such, like reference characters will be used to refer to like components, and the discussion of those components in the context of grounding ring 2 shown in FIGS. 1-7 is equally applicable to those components in the context of grounding ring 2 shown in FIGS. 8-12. In FIGS. 8-12, however, first clamping ring 4 comprises a C-clip, that is a clip having a C shape, as shown most clearly in FIG. 9. First clamping ring 4 can then be slipped over the end of protective covering 46 rather than rotated into place around protective covering 46, as is the case with grounding ring 2 shown in FIGS. 1-7. Moreover, second clamping member 12 can be a retaining clip, but is still disposable within channel 10 of first clamping member 4, as shown most clearly in FIGS. 10-11. Second clamping member 12 thus helps hold first clamping member 4 in place on protective covering 46. FIG. 12 shows this grounding ring 2 disposed on protective covering 46, with grounding wire 52 attached thereto.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article “a” or “the” in introducing an element should not be interpreted as being exclusive of a plurality of elements. Likewise, the recitation of “or” should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C. and should not be interpreted as requiring at least one of each of the listed elements A, B and C, regardless of whether A. B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

2 grounding ring
4 first clamping member
6 radially inward side
8 radially outward side
10 channel
12 second clamping member
14 first attachment portion
16 second attachment portion
18 third clamping member
20 channel walls
22 first arc section
24 second arc section
26 rotation end
28 fastening end
30 fastener hole
32 fastener
34 cutout
36 pinned hinge
38 pin
40 inward pin hole
42 outward pin holes
44 grasping portions
46 protective covering/dead-end receptacle
48 fixed feature
50 anchor hole
52 grounding wire
54 grounding wire mount
A axial direction
$C_4$ first clamping member center
$C_{12}$ second clamping member center
R radial direction
$\rho_4$ first clamping member radius of curvature
$\rho_{12}$ second clamping member radius of curvature

What is claimed is:

1. A grounding ring, comprising:
a first clamping member having a radially inward side and a radially outward side, the radially outward side at least in part defining a channel;
wherein the first clamping member comprises a first arc section and a second arc section, and wherein the first arc section and second arc section are rotatably attached to one another; and
a second clamping member disposable within the channel so as to prohibit the second clamping member from moving in an axial direction with respect to the first clamping member, the second clamping member being rotatable with respect to the first clamping member within the channel about the axial direction;
wherein the first arc section and second arc section each has a rotation end and a fastening end, the fastening end being disposed opposite the rotation end on a respective arc section, and wherein the first arc section and second arc section each includes a fastener hole at the fastener end.

2. The grounding ring of claim 1, wherein the second clamping member comprises a first attachment portion and a second attachment portion, and
wherein the grounding ring further comprises a third clamping member attachable to the first attachment portion and the second attachment portion so as to maintain the second clamping member within the channel and in contact with the first clamping member.

3. The grounding ring of claim 2, wherein the third clamping member comprises an elastic member.

4. The grounding ring of claim 2, wherein at least one of the second clamping member and the third clamping member comprises a ground carrier for attaching a grounding wire.

5. The grounding ring of claim 1, wherein the first clamping member has a first clamping member radius of curvature,
wherein the second clamping member has a second clamping member radius of curvature, and
wherein the first clamping member radius of curvature is approximately equal to the second clamping member radius of curvature.

6. The grounding ring of claim 1, wherein the channel comprises at least two channel walls that extend in a radial direction.

7. The grounding ring of claim 1, further comprising:
a fastener connecting the fastener end of the first arc section to the fastener end of the second arc section.

8. The grounding ring of claim 1, wherein the first arc section and second arc section each has a cutout on the radially inward side of the first clamping member.

9. The grounding ring of claim 1, wherein the first arc section and the second arc section are rotatably attached to one another by a pinned hinge.

10. A method of grounding a protective covering of an electrical connection, the method comprising:
disposing a radially inward side of a first clamping member around the protective covering, a radially outward side of the first clamping member at least in part defining a channel; and
disposing a second clamping member within the channel so as to prohibit the second clamping member from moving in an axial direction with respect to the first clamping member, the second clamping member being rotatable with respect to the first clamping member about the axial direction;
wherein the protective covering comprises a fixed feature that includes an anchor hole,
wherein the first clamping member includes a first fastener hole and a second fastener hole, and
wherein the method further comprises affixing the first clamping member to the protective covering by inserting a fastener through the first fastener hole, the anchor hole, and the second fastener hole and tightening the fastener.

11. The method of claim 10, further comprising:
affixing a grounding wire to the second clamping member.

12. The method of claim 10, further comprising:
affixing a third clamping member to the second clamping member so as to secure the second clamping member within the channel.

13. The method of claim 12, further comprising:
affixing a grounding wire to at least one of the second clamping member and the third clamping member.

14. The method of claim 10, wherein the first clamping member comprises:

a first arc section; and a second arc section, and wherein the first arc section and second arc section are rotatably attached to one another.

15. The method of claim 14, wherein the first arc section and second arc section each have a rotation end and a fastening end, the fastening end being disposed opposite the rotation end on a respective arc section, and wherein the first arc section and second arc section are rotatably attached to one another at the rotation ends.

16. The method of claim 15, wherein disposing the radially inward side of the first clamping member around the protective covering comprises bringing the fastening end of the first arc section closer to the fastening end of the second arc section.

17. The method of claim 10, wherein the first clamping member has a first clamping member radius of curvature, wherein the second clamping member has a second clamping member radius of curvature, and wherein the first clamping member radius of curvature is approximately equal to the second clamping member radius of curvature.

* * * * *